US012485480B2

(12) United States Patent
Park et al.

(10) Patent No.: US 12,485,480 B2
(45) Date of Patent: Dec. 2, 2025

(54) METHOD OF MAKING COPPER FOAM BALL

(71) Applicant: CellMo Materials Innovation, Inc., Berkeley, CA (US)

(72) Inventors: Hyeji Park, Seoul (KR); Heeman Choe, Conroe, TX (US)

(73) Assignee: CellMo Materials Innovation, Inc., Conroe, TX (US)

( * ) Notice: Subject to any disclaimer, the term of this patent is extended or adjusted under 35 U.S.C. 154(b) by 0 days.

(21) Appl. No.: 17/755,922

(22) PCT Filed: Nov. 12, 2020

(86) PCT No.: PCT/US2020/060282
§ 371 (c)(1),
(2) Date: May 11, 2022

(87) PCT Pub. No.: WO2021/097127
PCT Pub. Date: May 20, 2021

(65) Prior Publication Data
US 2022/0389962 A1    Dec. 8, 2022

Related U.S. Application Data

(60) Provisional application No. 62/934,497, filed on Nov. 12, 2019.

(51) Int. Cl.
*F16C 33/32* (2006.01)
*B22F 3/00* (2021.01)
(Continued)

(52) U.S. Cl.
CPC .............. *F16C 33/32* (2013.01); *B22F 3/004* (2013.01); *B22F 3/1143* (2013.01); *B22F 3/222* (2013.01);
(Continued)

(58) Field of Classification Search
CPC ........ B22F 3/004; B22F 3/1143; B22F 3/222; B22F 2301/10; B22F 2301/15;
(Continued)

(56) References Cited

U.S. PATENT DOCUMENTS 3,177,161 A * 4/1965 Smith-Johannsen ... B22F 3/222
264/43
2017/0025683 A1    1/2017 Park et al.

FOREIGN PATENT DOCUMENTS

WO    WO-2017037482 A2 *  3/2017  .............. B01J 23/50
WO    2019173849 A1    9/2019

OTHER PUBLICATIONS

Hartmut Goehler et. al. Functionalized Metallic Hollow Sphere Structures, Advanced Engineering Materials 2014, 16, No. 3 (Year: 2014).*

(Continued)

*Primary Examiner* — Sally A Merkling
*Assistant Examiner* — Nazmun Nahar Shams
(74) *Attorney, Agent, or Firm* — Aka Chan LLP

(57) ABSTRACT

A metal foam ball, several millimeters in diameter, is manufactured to have an open-pore structure to absorb fluid (e.g., gas and liquid) such as water or lubricant. As an example, a copper foam ball is manufactured via a freeze casting method using prepared oxide powder slurry where a spherical silica gel mold is used to freeze the slurry, which is subsequently dried at low temperature in vacuum and then sintered at high temperature. For improved oxidation, copper alloy foam ball or copper foam ball coated with tin can also be manufactured through the same method. For improved strength, steel, copper-nickel alloy, or titanium foam ball can also be manufactured through the same method.

26 Claims, 4 Drawing Sheets

(51) Int. Cl.
  *B22F 3/11*  (2006.01)
  *B22F 3/22*  (2006.01)
  *C22C 9/06*  (2006.01)
  *C23C 18/16*  (2006.01)
  *C23C 18/31*  (2006.01)
  *F16C 33/66*  (2006.01)

(52) U.S. Cl.
  CPC ............ *C22C 9/06* (2013.01); *C23C 18/1637* (2013.01); *C23C 18/1648* (2013.01); *C23C 18/31* (2013.01); *F16C 33/6648* (2013.01); *B22F 2301/10* (2013.01); *B22F 2301/15* (2013.01); *B22F 2301/30* (2013.01); *B22F 2303/01* (2013.01); *F16C 2202/10* (2013.01); *F16C 2202/64* (2013.01); *F16C 2204/10* (2013.01); *F16C 2220/20* (2013.01); *F16C 2223/30* (2013.01); *F16C 2300/12* (2013.01)

(58) Field of Classification Search
  CPC .... B22F 2301/30; B22F 2303/01; C22C 9/06; C23C 18/1637; C23C 18/1648; C23C 18/31; F16C 33/32; F16C 33/6648; F16C 2202/10; F16C 2202/64; F16C 2204/10; F16C 2220/20; F16C 2223/30
  See application file for complete search history.

(56) References Cited

OTHER PUBLICATIONS

Nguyen T. Tuan et. al. Synthesis of nanoporous Cu films by dealloying of electrochemically deposited Cu—Zn alloy films, Corrosion Science 80 (2014) 7-11]. (Year: 2014).*
Ji Hyun Um, et.al.3D macroporous electrode and high-performance in lithium-ion batteries using SnO2 coated on Cu foam, Scientific Reports | 6:18626 | DOI: 10.1038/srep18626, 2016 (Year: 2016).*
Kyungju Nam et.al. ["Freeze Casting is a Facile Method to Create Solid Solution Alloy Foams: Cu—Ni Alloy Foams via Freeze Casting", Adv. Eng. Mater. 2019, 21, 1801265] (Published online: Feb. 15, 2019). (Year: 2019).*
Xinli Liu, et al. ["Porous Cu foams with oriented pore structure by freeze casting", Materials Letters 205 (2017) 249-252] (Year: 2017).*
Kiyoshi Araki et al. ["Porous Ceramic Bodies with Interconnected Pore Channels by a Novel Freeze Casting Technique", J. Am. Ceram. Soc., 88 [5] 1108-1114 (2005)] (Year: 2005).*
Mark A. Atwater, et.al. ["Solid State Porous Metal Production: a Review of the Capabilities, Characteristics, and Challenges", Adv. Eng. Mater. 2018, 20, 1700766] (Year: 2018).*
International Search Report, PCT Application PCT/US2020/060282, Dec. 23, 2020, 4 pages.

* cited by examiner

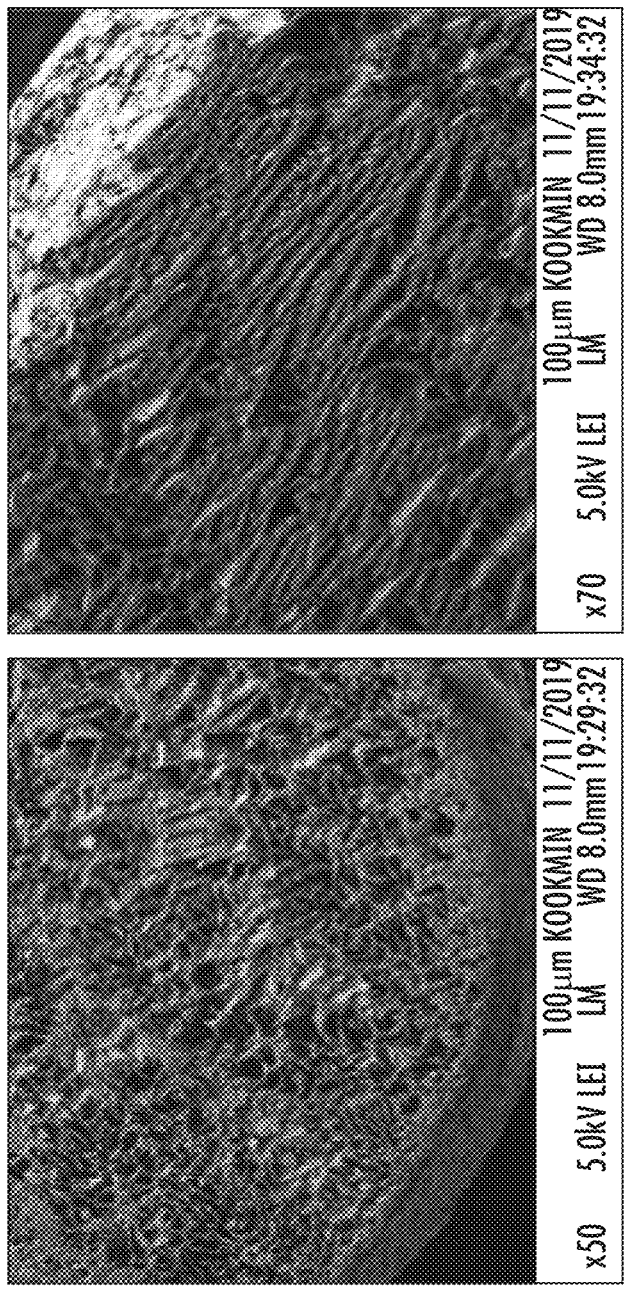

METHOD OF MAKING COPPER FOAM BALL

CROSS-REFERENCE TO RELATED APPLICATIONS

This patent application is a section 371 national phase filing of PCT application PCT/US2020/060282, filed Nov. 12, 2020, which claims the benefit of U.S. patent application 62/934,497, filed Nov. 12, 2019.

BACKGROUND OF THE INVENTION

This invention relates to metal forms, and more specifically, to metal foams manufactured spherical in shape. Some examples include copper, copper alloy, titanium, nickel, and steel foams in a spherical or ball shape.

There is a need for improved techniques to manufacture metal foam balls (e.g., copper foam balls) for use in specialized applications where liquid can be absorbed into the metal foam ball in operation due to their open surface pores (e.g., water purification or micro bearings).

BRIEF SUMMARY OF THE INVENTION

A metal foam ball (e.g., copper foam ball) is manufactured to have an open pore surface to absorb gas and liquid such as water or lubricant. The metal foam ball can also be used as part of a water purification system.

In an implementation, a method includes: fabricating the metal foam ball with pore size ranging from several micrometers to several tens of micrometers and applying them as part of a micro ball bearing or water infiltration system without an additional extensive machining process such as CNC (computer numerical control) machining.

A method of manufacturing metal foam balls includes: (a) freezing the metal (or metal oxide) slurry in a silica gel or any other pre-shaped spherical mold in contact with cold surface of a copper or aluminum rod (e.g., cooled by liquid nitrogen or dry ice); (b) drying the frozen slurry of spherical shape under reduced pressure and low temperature (e.g., using a freeze dryer), forming a metal or metal-oxide foam-ball green body; (c) reducing or sintering the green-body metal foam ball to achieve three dimensionally connected metal foam balls with open surface pores being capable of absorbing water or lubricant; and (d) coating the metal foam ball with tin on the surface if necessary (e.g., to improve oxidation and corrosion resistance) through a deposition process (e.g., electroless plating).

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4A and 4B shows cross-sectional scanning electron micrographs of the final copper foam ball containing numerous open pores with three dimensionally connected structure in the entire interior of the foam.

DETAILED DESCRIPTION OF THE INVENTION

The figures show the manufacture of a copper foam ball and show some photographs of a copper foam ball, including some scanning electron microscope (SEM) images of a ball surface with numerous open pores and ball cross section. As an example of a specific application, among many others, this copper foam ball can be used as part of a water purification or micro ball bearing system that is capable of storing lubricant over a period of time.

This patent describes some examples of implementations with specific dimensions, measurements, and values. These are not intended to be exhaustive or to limit the invention to the precise form described. The values, percentages, times, and temperatures are approximate values. These values can vary due to, for example, measurement of manufacturing variations or starting powder chemistry or tolerances or other factors. For example, depending on the tightness of the manufacturing and measurement tolerances, the values can vary plus or minus 5 percent, plus or minus 10 percent, plus or minus 15 percent, or plus or minus 20 percent.

Further, the values are for a specific implementation, and other implementations can have different values, such as certain values made larger for a larger-scaled sized process or product, or smaller for a smaller-scaled product. A device, apparatus, or process may be made proportionally larger or smaller by adjusting relative measurements proportionally (e.g., maintaining the same or about the same ratio between different measurements). In various implementations, the values can be the same as the value given, about the same of the value given, at least or greater than the value given, or can be at most or less than the value given, a range within or outside of any values presented, or any combination of these.

Some techniques or flows are described. A flow may have additional steps (not necessarily described in this patent), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular application or based on the situation.

The copper foam balls are manufactured to have a diameter from about 2 millimeters to about 25 millimeters, depending on the size of the mold used. The copper foam balls are manufactured using a silica gel or silicone mold. The copper foam ball has an open pore surface, which can be confirmed by dropping water on the surface of the ball.

Figure 1B:
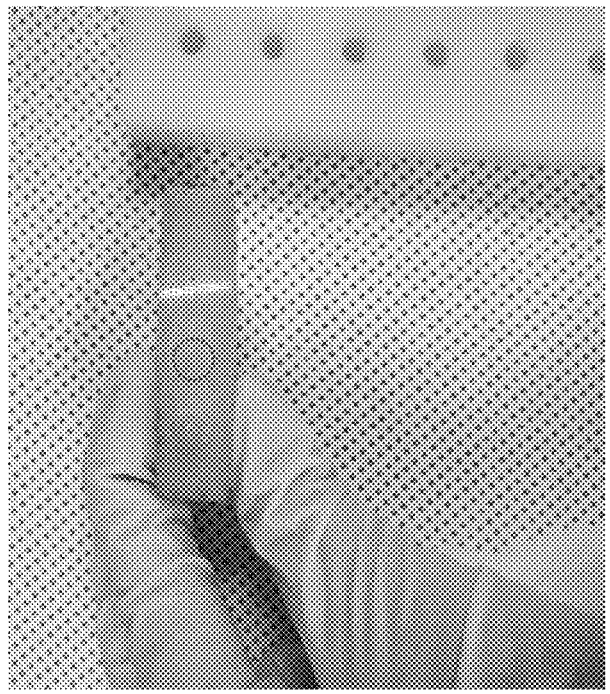
FIGS. 1A and 1B shows optical micrographs of flexible silica gel molds used in this invention to freeze the prepared copper oxide slurry into spherical ball shape.
Figure 1A:
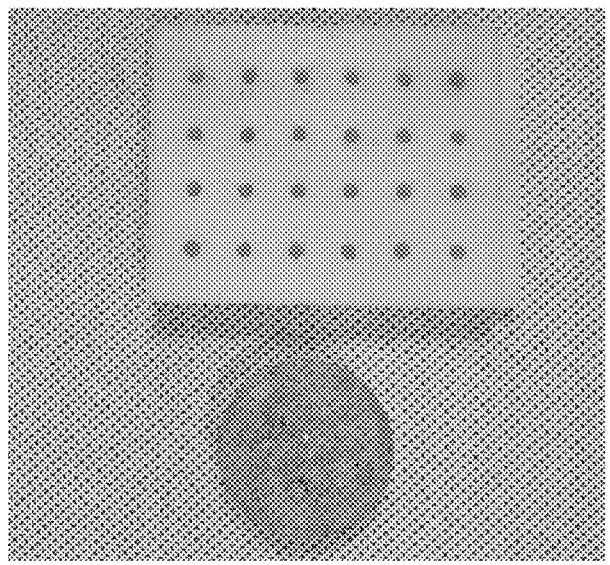

A photograph in the figure shows copper foam balls in a dish and green-body balls in another dish. A photograph in the figure shows a top view of a silicone mold. A photograph in the figure shows a view of a silicone mold (FIGS. 1A and 1B). FIG. 1A is an optical photograph showing a top view of a silicone mold, while FIG. 1B shows a side view of a silicone mold. In FIG. 1B, a spherical shape of the mold is outlined using broken lines. The copper foam ball has an open pore surface; this has been confirmed by dropping water (or other liquid or fluid) on an upper surface of the ball, and then observing water flowing through the porous ball (propagating via gravity) through to a lower surface of the ball and onto a surface on which the ball sits.

Figure 2:
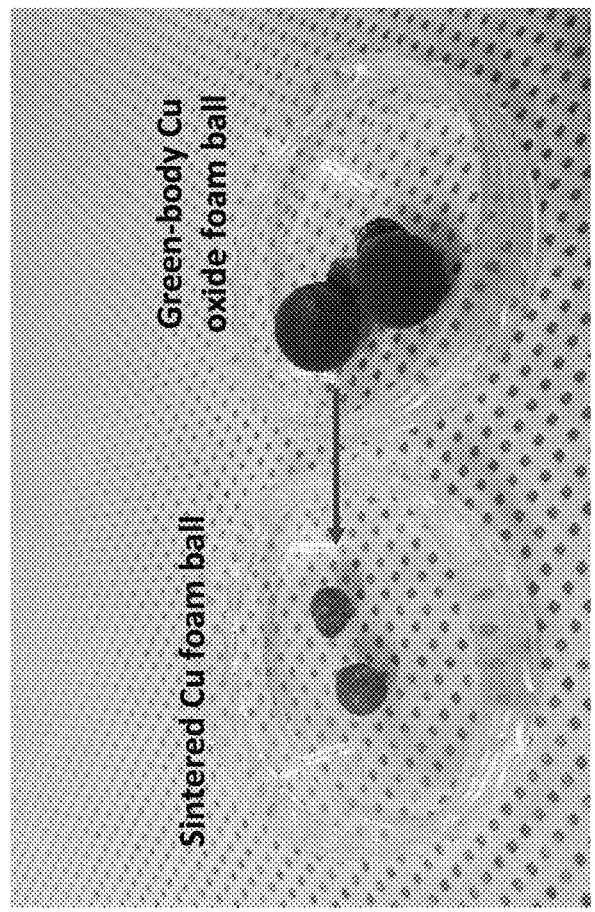
FIG. 2 shows optical micrographs of copper foam balls before (right) and after (left) a high-temperature reduction and sintering process. The green-body copper oxide foam balls after being frozen and dried appear black while the sintered copper foam balls appear orange-red after the reduction and sintering process. The volume of the green-body copper oxide foam ball is approximately 50 percent larger than that of the sintered copper foam ball due to the shrinkage in reduction and sintering process.

FIG. 2 shows a photograph shows a copper foam ball in a first dish (left, FIG. 2) and green-body copper oxide foam balls in a second dish (right, FIG. 2).

Figure 3:
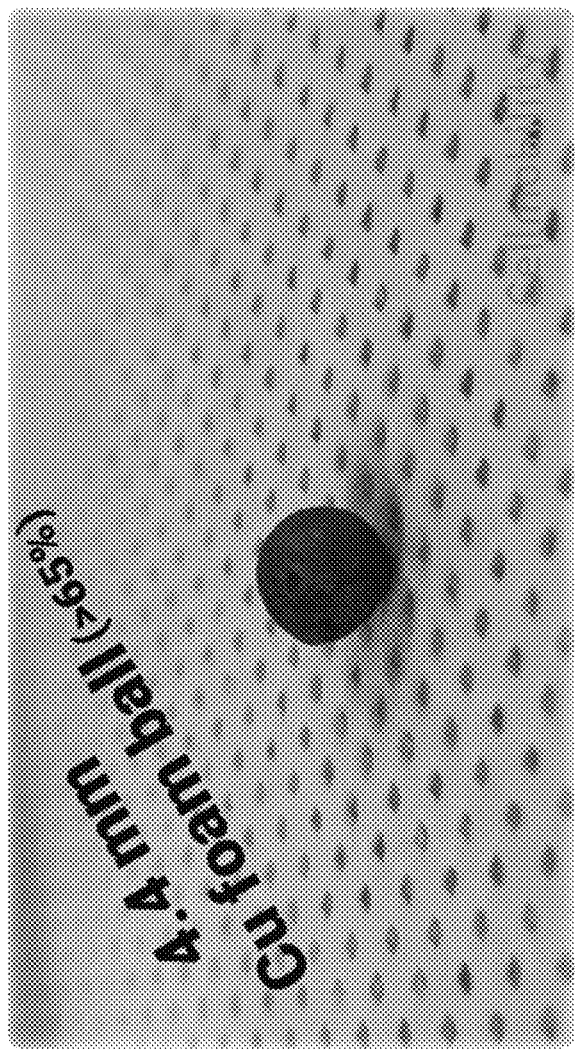
FIG. 3 shows optical micrograph of the final copper foam ball with open-pore structure being capable of absorbing water or lubricant. The copper foam ball has about 65% porosity with an average pore size being 50 microns and is 4.4 millimeters in diameter.

FIG. 3 shows an optical photograph of a copper foam ball having a diameter of about 4.4 millimeters, a porosity of greater than about 65 percent, and a pore size of about 50 microns.

The copper foam ball in FIG. 3 shows after forming in the silicone mold described. In other implementations, the ball will be entirely spherical, without imperfections—similar to a typical steel or other metal ball bearing, with similar tolerances. This may be achieved with additional steps after the silicone mold such as mechanical polishing or chemical-mechanical polishing. Or alternatively, a different mold may be used. For example, a process may include:

1. The balls are then filed, or tumbled to remove flash and burrs.
2. Soft grinding is employed to produce balls of uniform size.
3. The balls undergo a finish grinding process to achieve finished size and roundness specifications.
4. Finally, the balls undergo a lapping process to achieve final tolerances and surface finish requirements FIGS. 4A and 4B show scanning electron microscope (SEM) images of cross sections of a sintered copper foam ball containing three-dimensionally connected pores of approximately 50 microns in diameter.

A process of making a copper foam ball includes:

A water-based freeze casting of a copper oxide (CuO) slurry is prepared. Freeze casting is described in U.S. patent application Ser. No. 13/930,887, filed Jun. 28, 2013, U.S. patent application Ser. No. 14/256,838, filed Apr. 18, 2014, and U.S. patent application 62/641,223, filed Mar. 9, 2018, which are incorporated by reference along with all other references cited in this application.

1. A copper oxide (CuO) slurry is prepared by suspending about 7 to 20 volume percent copper oxide powder in deionized water, and about 1 to 4 weight percent polyvinyl alcohol (PVA) is then added as a binder. The metal-oxide particles in the slurry is then uniformly dispersed in the solution using stirring and sonication.
2. The copper oxide slurry is injected through a syringe into a silicone mold of spherical shape, which is maintained at about −20 degrees Celsius to about −100 degrees Celsius (e.g., −50 degrees Celsius), depending on the desired pore size and shape. The spherical mold size is selected in this embodiment by taking into account approximately 50-percent volume shrinkage of the final copper foam ball upon sintering.
3. Frozen balls are dried in the freeze drier at about −60 degrees Celsius or lower in a vacuum of less than 10^−2 Torricelli (where x^y refers to x to the power of y).
4. Dried green-body balls are sintered in two steps: (i) about 1 to 5 hours (e.g., 0.5, 1.5, 2, 3, 4, 6, or 7 hours) at about 200 to 300 degrees Celsius (e.g., 150, 175, 180, 225, 250, 257, 325, 350, or 375 degrees Celsius) and (ii) about 1 to 5 hours (e.g., 0.5, 1.5, 2, 3, 4, 6, or 7 hours) at about 750 to 950 degrees Celsius under a 5-percent hydrogen and argon atmosphere (e.g., 2, 3, 4, 6, 7, or 8 percent).
5. The manufactured copper foam balls are polished and etched in hydrochloric acid solution to obtain purer copper foam ball products by removing copper oxide layer on the surface.

In an implementation, a method of manufacturing of a metal foam ball including a three dimensionally connected pore structure with its porosity ranging from about 50 percent to about 90 percent (e.g., 42, 45, 48, 52, 58, 60, 70, 75, 88, 93, 94, or 95 percent). The metal foam ball has open-pore structure being capable of absorbing water or lubricant and is used as a micro ball bearing.

The manufacturing process to form the metal foam ball material includes a freeze casting method including a powder slurry freezing in any preshaped spherical mold with a desired diameter. The preshaped spherical mold can be made of a silica gel or silicone mold of spherical shape, and the mold is flexible. A volume of the preshaped spherical mold is prepared larger by about 20 percent to about 170 percent than the desired final volume of the sintered metal-foam ball with the final diameter of the metal-foam ball ranging from 2 millimeters to 25 millimeters upon sintering.

The metal-foam ball material can be made of at least one of copper, copper-tin alloy, copper-zinc alloy, copper-nickel alloy, copper-silicon alloy, copper-aluminum alloy, nickel, zinc, tin, gold, silver, iron, steel, aluminum, or titanium, or a combination. The copper-nickel alloy material is the copper-nickel alloy foam ball of $Cu_{x}Ni_{1-x}$ where x is a value in a range from 0.1 to 0.9.

The metal-foam ball material can include copper, and the copper foam ball is etched in hydrochloric or diluted hydrochloric acid solution from about 3 seconds to about 3 minutes to obtain a purer copper foam ball by removing copper oxide layer formed on the surface upon sintering. The metal-foam ball material can include copper coated with tin via an electroless plating process including the immersion of the sintered copper foam ball into a tin plating solution.

A copper oxide powder can be mixed in water or camphene as a solvent in a volume fraction of between about 7 volume percent (e.g., 5 or 6 volume percent) to about 22 volume percent (e.g., 23, 24, 25, 26, 27, 28, 29, or 30 volume percent) for the preparation of slurry following the addition of about 1 weight-percent to about 4 weight-percent binder.

The manufacturing process to form the metal-foam ball material can include a freeze casting method including a metal or metal-oxide powder slurry freezing or drying and reduction or sintering processes, where the water-based powder slurry is frozen and dried at low temperature between about −10 and −80 degrees Celsius to form a green body and then reduced or sintered at a high temperature to form a three dimensionally connected pore structure.

There can be reduction at temperature from about 200 degrees Celsius (e.g., 210, 225, 230, 235, 240, 245, or 250 degrees) to about 350 degrees Celsius (e.g., 310, 325, 235, 360, 375, 385, 390, 400, or 450 degrees). There can be a sintering at temperature from about 700 degrees Celsius (e.g., 650, 675, 685, 690, 710, 725, 730, 745, 750, or 800 degrees) to about 1000 degrees Celsius (e.g., 900, 925, 950, 975, 985, 990, 1010, 1025, 1030, 1050, 1080, or 1100 degrees). The process can include reducing and then subsequently sintering in combination, such as reducing at temperature from about 200 degrees Celsius to about 350 degrees Celsius, and then sintering at temperature from about 700 degrees Celsius to about 1000 degrees Celsius, or vice versa.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of manufacturing of a metal-foam ball comprising a three dimensionally connected pore structure with its porosity ranging from about 50 percent to about 90 percent,
wherein the three dimensionally connected pore structure is formed using water by way of a freeze-casting method comprising
mixing metal or metal oxide particles in deionized water and a polyvinyl alcohol binder to obtain a slurry,
injecting the slurry into a spherical mold, the spherical mold having a volume that is about 20 percent to about 170 percent larger than a volume of the metal-foam ball,
freezing the slurry in the mold at a temperature from about -20 degrees Celsius to about -100 degrees Celsius to obtain a frozen metal or metal oxide ball, and
freeze drying the frozen metal or metal oxide ball.

2. The method of claim 1 wherein the metal-foam ball has an open-pore structure being capable of absorbing water or lubricant and is used as a micro ball bearing.

3. The method of claim 1 wherein the manufacturing process to form the metal-foam ball material comprises the freeze casting method comprising a powder slurry freezing in any preshaped spherical mold with a desired diameter.

4. The method of claim 3 wherein the preshaped spherical mold is made of a silica gel or silicone mold of spherical shape, and the mold is flexible.

5. The method of claim 3 wherein a final diameter of the metal-foam ball ranges from 2 millimeters to 25 millimeters upon sintering.

6. The method of claim 1 wherein the metal-foam ball material comprises at least one of copper, copper-tin alloy, copper-zinc alloy, copper-nickel alloy, copper-silicon alloy, copper-aluminum alloy, nickel, zinc, tin, gold, silver, iron, steel, aluminum, or titanium, or a combination.

7. The method of claim 6 wherein the copper-nickel alloy material is the copper-nickel alloy foam ball of Cu(subscript(x))Ni(subscript(1-x)) where x is a value in a range from 0.1 to 0.9.

8. The method of claim 3 wherein the metal-foam ball material comprises copper, and the copper foam ball is etched in hydrochloric or diluted hydrochloric acid solution from about 3 seconds to about 3 minutes to obtain a purer copper foam ball by removing a copper oxide layer formed on the surface upon sintering.

9. The method of claim 3 wherein the metal-foam ball material comprises copper coated with tin via an electroless plating process comprising the immersion of the sintered copper foam ball into a tin plating solution.

10. The method of claim 3 wherein the power slurry is obtained by mixing a copper or copper oxide powder in water or camphene as a solvent in a volume fraction of between about 7 volume percent to about 22 volume percent for the preparation of slurry following the addition of about 1 weight-percent to about 4 weight-percent binder.

11. The method of claim 3 wherein the manufacturing process to form the metal-foam ball material comprises a freeze casting method comprising a metal or metal-oxide powder slurry freezing or drying, or both, to form a green body.

12. The method of claim 11 wherein the prepared powder slurry is frozen and dried at a temperature between -10 Celsius and -80 degrees Celsius to form the green body.

13. The method of claim 11 wherein the green body is reduced at a temperature from about 200 degrees Celsius to about 350 degrees Celsius.

14. The method of claim 11 comprising
reducing the green body at a temperature from about 200 degrees Celsius to about 350 degrees Celsius, and
after reducing, sintering at a temperature from about 700 degrees Celsius to about 1000 degrees Celsius,
wherein the reducing and sintering of the green body forms a three dimensionally connected pore structure.

15. The method of claim 1 wherein the metal-foam ball comprises the three dimensionally connected pore structure in the entire interior of the foam.

16. A method of manufacturing of a metal-foam ball comprising a three dimensionally connected pore structure with its porosity ranging from about 50 percent to about 90 percent,
wherein the three dimensionally connected pore structure is formed using water by way of a freeze-casting method comprising
mixing metal or metal oxide particles in deionized water and a polyvinyl alcohol binder to obtain a slurry,
injecting the slurry into a spherical mold,
freezing the slurry in the mold at a first temperature from about -20 degrees Celsius to about -100 degrees Celsius to obtain a frozen metal or metal oxide ball,
freeze drying the frozen metal or metal oxide ball, and
sintering the frozen metal or metal oxide ball to obtain a sintered metal-foam ball, wherein a volume of the spherical mold is larger by about 20 percent to about 170 percent than a final desired volume of a sintered metal-foam ball.

17. The method of claim 16 wherein the sintered metal-foam ball comprises the three dimensionally connected pore structure in the entire interior of the foam.

18. The method of claim 16 wherein the sintered metal-foam ball comprises a final diameter ranging from 2 millimeters to 25 millimeters.

19. The method of claim 16 wherein the sintered metal-foam ball comprises a three-dimensionally connected pore structure with porosity ranging from about 50 percent to about 90 percent and open pore structure, capable of absorbing water or lubricant.

20. The method of claim 16 wherein the freeze-casting method comprises
reducing the frozen metal or metal oxide ball at a temperature from about 200 degrees Celsius to about 350 degrees Celsius.

21. The method of claim 20 wherein the sintering the frozen metal or metal oxide ball is at a temperature from about 700 degrees Celsius to about 1000 degrees Celsius.

22. The method of claim 16 wherein the sintering the frozen metal or metal oxide ball is at a temperature from about 700 degrees Celsius to about 1000 degrees Celsius.

23. The method of claim 11 wherein the green body is sintered at temperature from about 700 degrees Celsius to about 1000 degrees Celsius.

24. The method of claim 12 wherein the green body is reduced at a temperature from about 200 degrees Celsius to about 350 degrees Celsius.

25. The method of claim 12 wherein the green body is sintered at temperature from about 700 degrees Celsius to about 1000 degrees Celsius.

26. The method of claim 12 comprising
   reducing the green body at a temperature from about 200 degrees Celsius to about 350 degrees Celsius, and
   after reducing, sintering at a temperature from about 700 degrees Celsius to about 1000 degrees Celsius,
   wherein the reducing and sintering of the green body forms a three dimensionally connected pore structure.

* * * * *